United States Patent [19]

Nakazawa et al.

[11] Patent Number: 5,145,147
[45] Date of Patent: Sep. 8, 1992

[54] NORMALLY CLOSED-TYPE FLUID CONTROL VALVE

[75] Inventors: Akira Nakazawa, Kyoto; Hiroshi Ohsasa, Miyanohigashi, both of Japan

[73] Assignee: Stec Inc., Kyoto, Japan

[21] Appl. No.: 704,348

[22] Filed: May 23, 1991

[30] Foreign Application Priority Data

May 26, 1990 [JP] Japan .................................. 2-136739

[51] Int. Cl.⁵ ............................................. F16K 31/04
[52] U.S. Cl. .............................. 251/129.06; 251/337; 251/11
[58] Field of Search ...................... 251/129.06, 129.19, 251/337, 11

[56] References Cited

U.S. PATENT DOCUMENTS

| | | | |
|---|---|---|---|
| 4,008,876 | 2/1977 | Bastle | 251/129.19 |
| 4,043,532 | 8/1977 | Draxler | 251/11 |
| 4,830,332 | 5/1989 | Miura et al. | 251/129.17 X |

Primary Examiner—Arnold Rosenthal
Attorney, Agent, or Firm—Price, Gess & Ubell

[57] ABSTRACT

An normally closed-type fluid control valve, having a guide standing through a counter member on the side of an upper surface of a valve base is provided with a cylindrical member having an engaging portion at its lower end and movable up and down on an inner the side thereof. Cylindrical member is provided with an actuator therewithin so that the actuator may be held by the cylindrical member. A support member 051452225 is fixed in position by means of the counter member and the guide is inserted into a hole opened at a position below a lower end portion of the actuator. A lower end side of the actuator is engaged with an upper surface of the support member and a pressing spring is interposed between the support member and the engaging portion of the cylindrical member to press a valve body against a valve seat formed in the valve base, whereby closing the said valve so that the pressing spring may be compressed by an output of the actuator during the time when the actuator is acting to separate the valve body from the valve seat, whereby opening the valve.

20 Claims, 5 Drawing Sheets

NORMALLY CLOSED-TYPE FLUID CONTROL VALVE

BACKGROUND OF THE INVENTION

1. Field of the Invention

The present invention relates to a normally closed-type fluid control valve for controlling a flow rate and a pressure of various kinds of fluid such as gases and liquids.

2. Description of the Prior Art

This kind of normally closed-type fluid control valve (hereinafter referred to as the valve) has been disclosed in for example Japanese Patent Application Laid-Open No. Sho 64-55487. It is shown in FIG. 4(A), (B).

Referring to FIG. 4(A), (B), reference numeral 51 designates a valve base comprising an inlet port 52 provided on the left side thereof, a vertical passage 53 communicating with said inlet port 52 provided at a center thereof, an upward opened fluid chamber 56 housing a diaphragm 55 fixed by means of a diaphragm counter member 54 provided in an upper portion thereof, an outlet port 57 communicating with said fluid chamber 56 provided on the right side thereof, an orifice 58 formed in an upper portion of said vertical passage 53 and a valve seat 59 formed around said valve mouth 58. Reference numeral 60 designates a cylindrical member standing on an upper surface of said valve base 51 so as to push down said diaphragm counter member 54 from outside of the diaphragm counter member 54 and it is fixed by means of a cylindrical counter member 62 fixedly mounted on said upper surface of the valve base 51 by means of bolts 61.

Said cylindrical member 60 is provided with a valve rod 63 standing therewithin under the condition that a lower end surface of said valve rod 63 is brought into contact with an upper surface of a central portion of said diaphragm 55. And, a pressing spring 65 for energizing the valve rod 63 downward is provided between an upper stepped portion 64 of the valve rod 63 and an upper inner surface of the cylindrical member 60 so that the diaphragm 55 may be normally engaged with said valve seat 59 to normally close said orifice 58 and thus normally close the valve by pressing the valve rod 63 in the direction of the diaphragm 55 by means of said pressing spring 65. In addition, the valve rod 63 is provided with a through hole (not shown) in a lower portion thereof. A bridge 66 inserted through said through hole and placed on an upper surface of the diaphragm counter member 54 is provided with a piezostack 67 comprising a large number of piezoelements laminated on an upper surface thereof so that the valve rod 63 may be lifted by the action of said piezostack, whereby the pressing spring 65 is compressed to separate the diaphragm 55 from said valve seat 59 and open the orifice 58 and thus the valve is opened.

In the valve having the above described construction, it is not required to provide moving members, such as the pressing spring 65 and an adjustable screw 68, within a fluid passage such as the fluid chamber 56, so that an effect occurs in that the production of metallic powders resulting from the contact among metals in the fluid passage can be prevented and thus an inside of the valve base 51 and a fluid can be prevented from being contaminated and damaged.

However, in the above described conventional valve, the piezostack 67 has not the so-called closed type construction, so that a problem occurs in an insulation.

And, a disadvantage occurs in that if it is intended to give the piezostack 67 a tightly closed construction, it is large-sized. In addition, the pressing spring 65 for energizing downward the valve rod 63 is provided between said upper stepped portion 64 of the valve rod 63 and said upper inner surface of the cylindrical member 60, so that a lead wire 69 for supplying the piezostack 67 with a voltage can not be taken out from above the piezostack 67 but can be taken out from the side portion of the piezostack 67. A disadvantage occurs in that an insulating construction for taking out said lead wire 69 is complicated and as a result this kind of valve is large-sized.

SUMMARY OF THE INVENTION

The present invention has been achieved paying attention to the above described matters and it is an object of the present invention to provide a compact valve not only capable of preventing metallic powders and the like from entering a fluid passage but also remarkably simple in construction.

In order to achieve the above described object, a valve according to the present invention is characterized in that a guide standing through a counter member on the side of an upper surface of a valve base is provided with a cylindrical member having an engaging portion at its lower end and movable up and down on an inner side thereof. The cylindrical member is provided with an actuator therewithin so that said actuator may be held by the cylindrical member, a support member fixed in position by means of said counter member and said guide being idly inserted into a hole opened at a position below a lower end portion of the actuator, and a lower end side of the actuator being engaged with an upper surface of said support member and a pressing spring being interposed between the support member and said engaging portion of the cylindrical member to always press a valve body against a valve seat formed in said valve base, whereby closing said valve so that said pressing spring may be compressed by an output of the actuator during the time when the actuator is acting to separate said valve body from said valve seat, whereby opening the valve.

In the valve having the above described characteristic construction, usually the valve body is pressed against the valve seat by means of the pressing spring interposed between the support member and the cylindrical member to close an orifice. And, when the actuator acts, the pressing spring is compressed by said output of the actuator to separate the valve body from the valve seat, whereby opening said orifice.

And, a mechanism not only contributing to the opening and closing of the valve but also preventing excessive sliding or wearing is provided at a position distant from a fluid flowing through the valve base, so that very small dusts, such as metallic powders, can be prevented from entering said fluid. In addition, in the case where the actuator is composed of a piezostack, a lead wire for supplying said piezostack with a voltage can be taken out from above the piezostack, so that a construction can be simplified, for example a compact tightly closed construction can be given to the piezostack.

BRIEF DESCRIPTION OF THE DRAWINGS

FIG. 4 shows the conventional valve, in which

DETAILED DESCRIPTION OF THE PREFERRED EMBODIMENTS

The preferred embodiments of the present invention will be below described with reference to the drawings.

Figure 1:
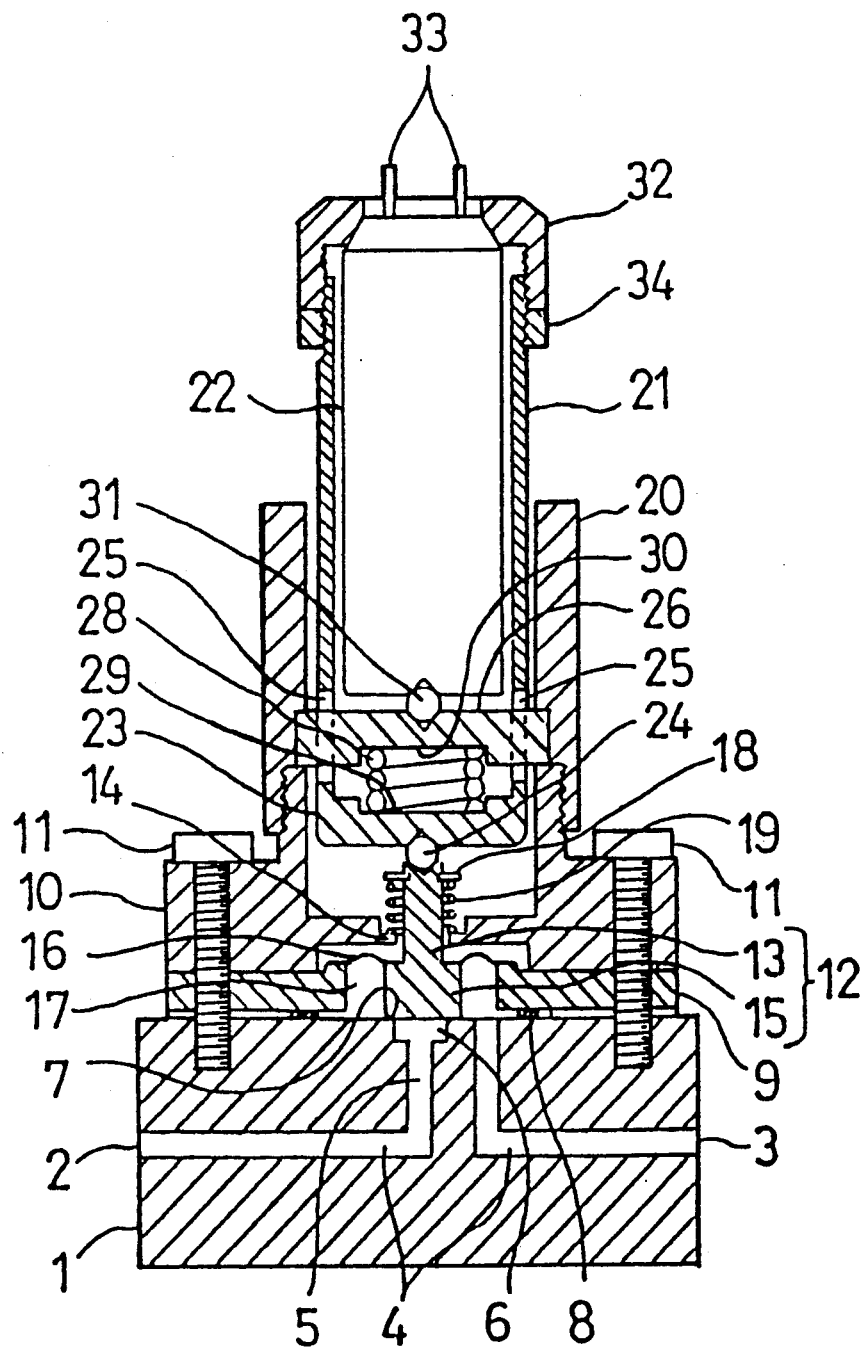
FIG. 1 is a longitudinal sectional view showing a valve according to one preferred embodiment of the present invention.

FIG. 1 shows one example of a valve according to the present invention. Referring to FIG. 1, reference numeral 1 designates a valve base, a fluid passage 4 being formed between an inlet port 2 and an outlet port 3, an upper portion of a vertical passage 5 communicating with said inlet port 2 being formed as an orifice 6, and a circumference of said orifice 6 being formed as a valve seat 7. Said valve base 1 is provided with a seal-setting member 9 for setting a seal member 8 on an upper surface thereof and a counter member 10 is fixedly mounted on an upper portion of said seal-setting member 9 by means of a clamping bolt 11. Reference numeral 12 designates a valve body opening and closing the orifice 6 and comprises a valve head portion 13 brought into contact with and separated from said valve seat 7 and a valve rod portion 15 extending upward from said valve head portion 13 and inserted into a circular spring-receiving portion 14 formed in said counter member 10. A diaphragm 16 is extended from an upper surface of the valve head portion 13 to the seal-setting member 9 by welding so as to form a leak-tight fluid chamber 17 between said diaphragm 16 and said upper surface of the valve base 1. On the other hand, a lifting spring 19 is provided between said spring-receiving portion 14 and a spring-engaging portion 18 provided in an upper portion of said valve rod portion 15 so as to be put on the valve rod portion 15, whereby separating said valve body 12 from the valve seat 7 to some extent.

Reference numeral 20 designates a cylindrical guide opened at both ends, that is an upper end and a lower end, and screwed on the counter member 10. A cylindrical member 21 is provided so as to move up and down along inner wall surfaces of said guide 20 and the counter member 10. In addition, piezostack 22 as an actuator is provided in said cylindrical member 21.

Figure 2:
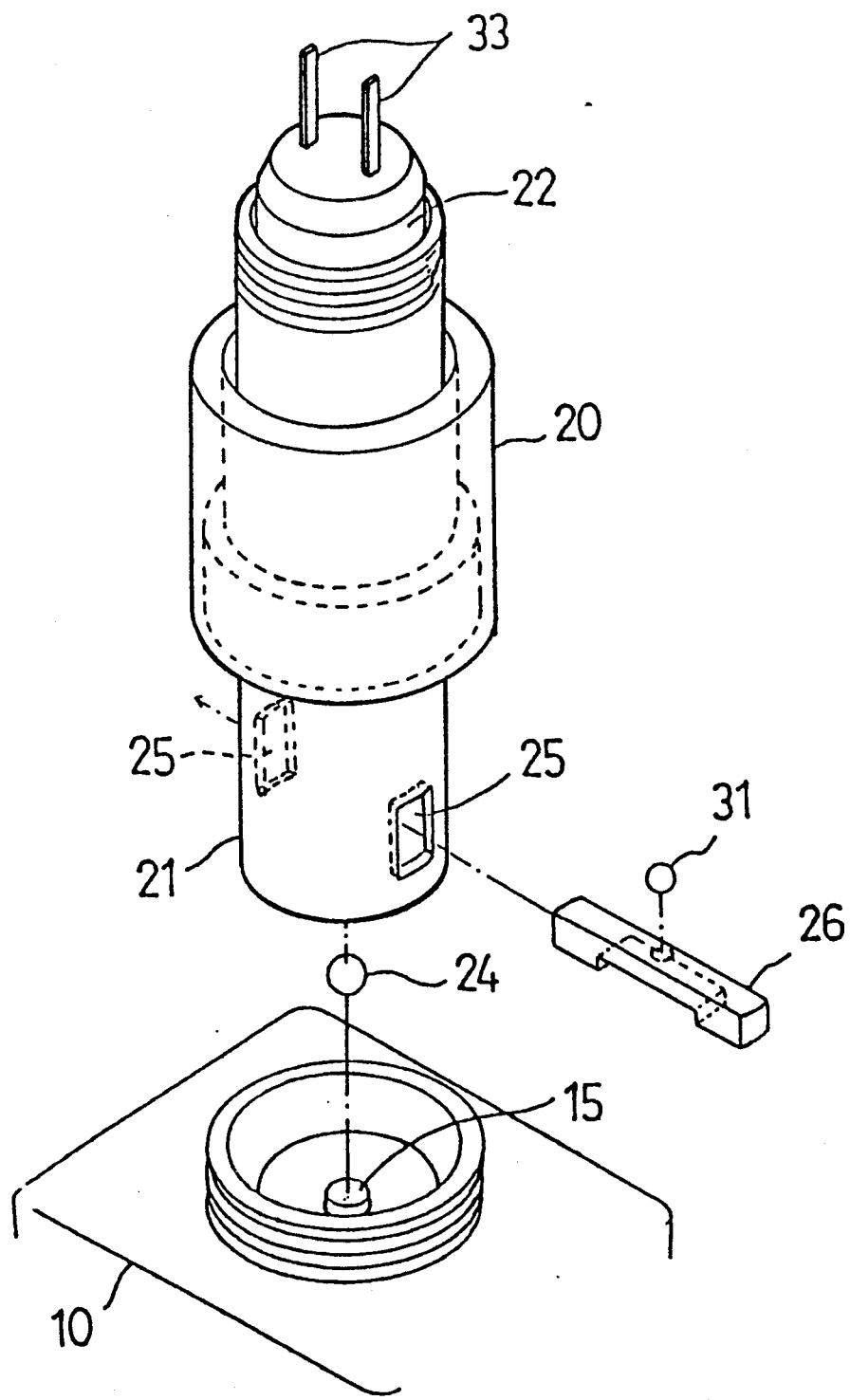
FIG. 2 is a disintegrated perspective view showing main parts of said valve shown in FIG. 1.

That is to say, the cylindrical member 21 is not only opened in an upper portion thereof but also provided with an engaging portion 23 formed on the side of a lower end thereof and said engaging portion 23 is held by the valve rod portion 15 of said valve body 12 through a ruby sphere 24. And, the cylindrical member 21 is provided with two holes 25 opened face to face in a lower portion of a side surface thereof, a support member 26 being idly inserted through said holes 25 so as to project from the holes 25 at end portions thereof, and said support member 26 being fixed in position by means of the guide 20 screwed on the counter member 10 and the counter member 10, as shown in FIG. 2.

Referring to FIG. 1 again, reference numeral 28 designates a pressing spring interposed between a spring-receiving portion 29 formed on an upper surface of the engaging portion 23 and a spring-receiving portion 30 formed on a lower surface of the support member 26 for always energizing the engaging portion 23 downward to press the valve body 12 against the valve seat 7 against an energizing force of said lifting spring 19, whereby normally closing the orifice 6 by the valve head portion 13. And, said piezostack 22 is held by the support member 26 through a ruby sphere 31 at a lower end portion thereof and held by an opened degree-regulating member 32 screwed on an outer circumference of an upper portion of the cylindrical member 21 at an upper end thereof. Reference numeral 33 designates a lead wire for applying a voltage and reference numeral 34 designates a clamping nut.

And, in said valve having the above described construction, the valve body 12 is pressed toward the valve seat 7 against said upward energizing force of the lifting spring 19 by an energizing force of said pressing spring 28 interposed between the support member 26 and the engaging portion 23 of the cylindrical member 21, so that the orifice 6 is closed by the valve rod portion 15 to close the valve, in the usual time when no voltage is applied to the piezostack 22.

And, upon applying a voltage to the piezostack 22, the piezostack 22 expands in an up and down direction but the lower end side of the piezostack 22 is held by the support member 26, so that said expansion produces an upward force, which lifts the cylindrical member 21 through said opened degree-regulating member 32, and as a result the pressing spring 28 is compressed to stretch the lifting spring 19. Thus, the valve body 12 is separated from the orifice 6 by the upward energizing force to open the valve.

In the valve having the above described construction, portions contributing to the opening and closing of the valve body 12 and sliding and wearing with said opening and closing actions are not provided in said passages, through which a fluid passes, so that there is not the possibility that very small dusts, such as metallic powders, are mixed in said fluid and the fluid is leaked outside. And, the construction is simplified on the whole and an area of portions brought into contact with the fluid is reduced and thus the members above the diaphragm 16 are prevented from being eroded and deteriorated even though the fluid is an aggressive gas and the like. In addition, since said lead wire 33 for supplying the piezostack 22 with a voltage can be taken out from above the piezostack 22, for example a compact tightly closed construction can be given to the piezostack 22, that is the construction can be simplified to small-size the valve of this type.

Figure 3:
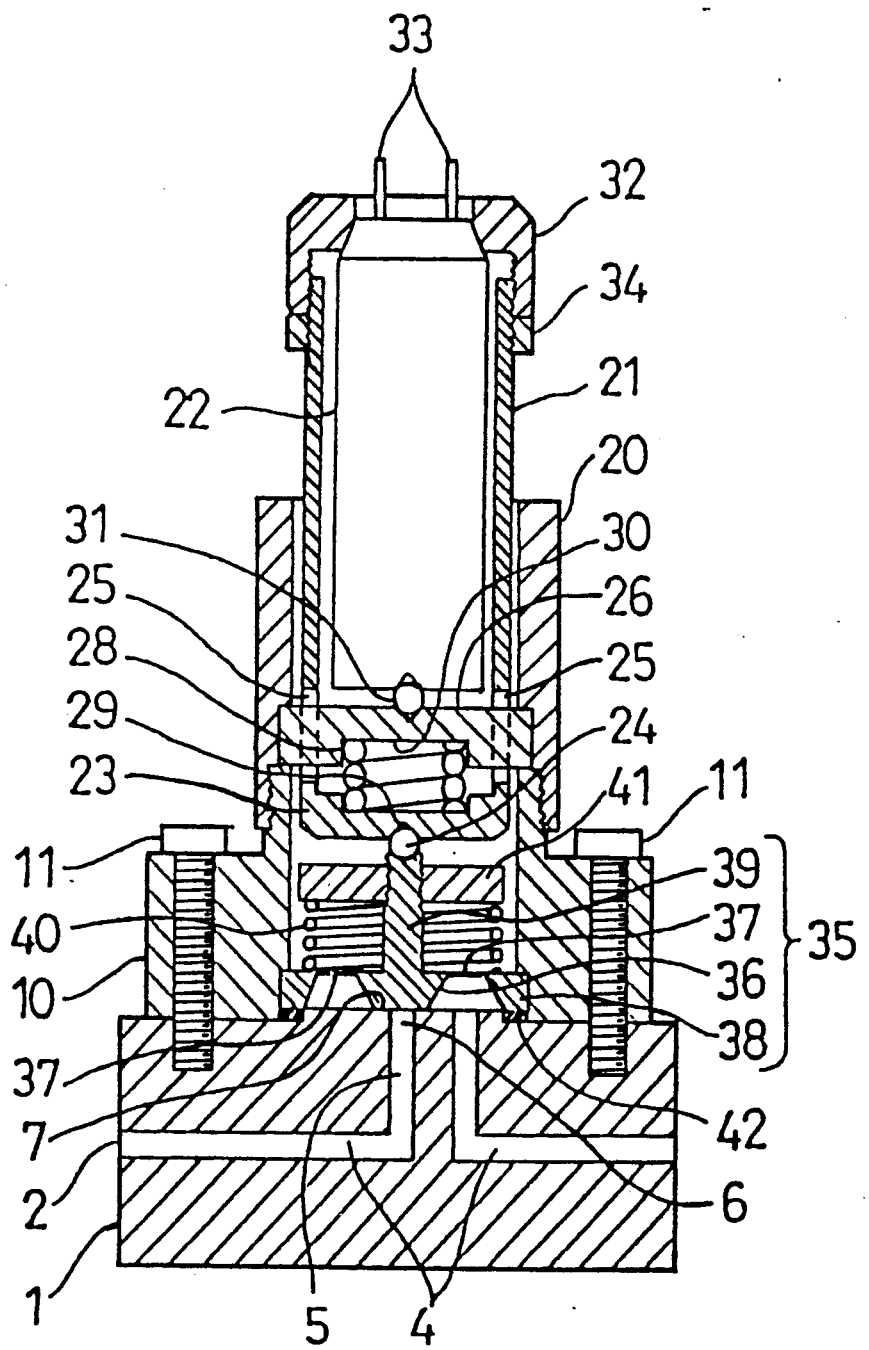
FIG. 3 is a longitudinal sectional view showing a valve according to another preferred embodiment of the present invention.
Figure 4A:
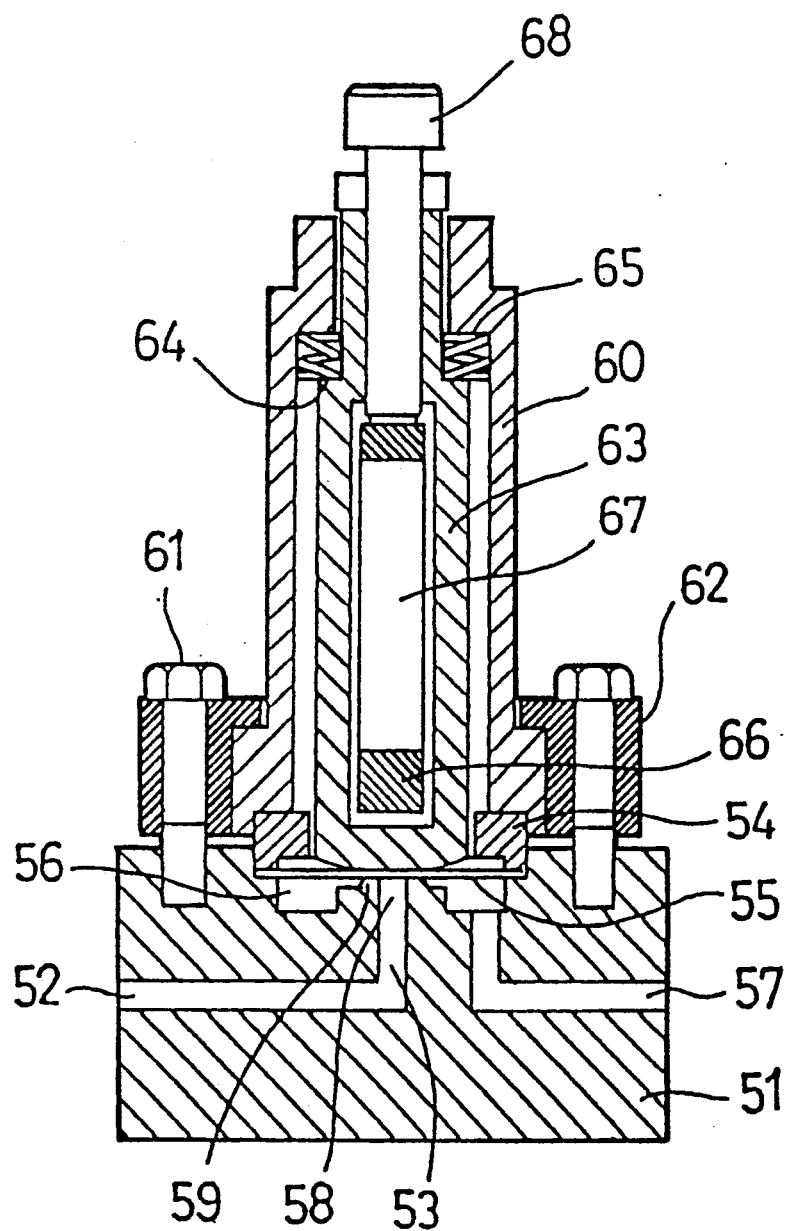
FIG. 4(A) is a front sectional view.
Figure 4B:
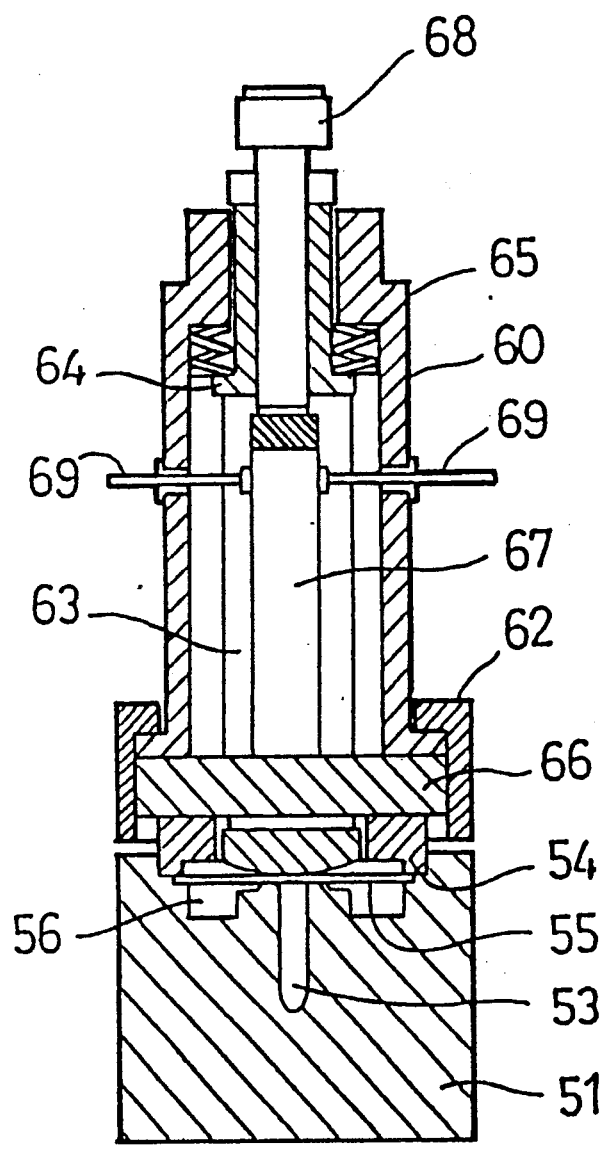
FIG. 4(B) is a side sectional view.

FIG. 3 shows an example of a valve according to another preferred embodiment of the present invention. Referring to FIG. 3, reference numeral 35 designates a valve body comprising a thin-walled (for example about 0.2 mm thick) elastic portion 37 formed on a circumference of a valve head portion 36 and an engaging portion 38 engaged with an upper surface of a valve base 1 outside of said elastic portion 37 and fixedly held by a counter member 10. A lifting spring 40 is screwed on a valve rod portion 39 extending upward from said valve head portion 36. Other constructions are quite same as in FIG. 1. In addition, reference numeral 41 designates a spring-engaging member and reference numeral 42 designates a sealing member.

Also in this preferred embodiment, it goes without saying that similar effects to those in the preferred embodiment shown in FIG. 1 can be obtained.

The present invention is not limited by the above described respective preferred embodiments. For example, a thermal driving-type actuator may be used in place of the piezostack 22.

Since the present invention has the above described construction, not only there is not the possibility that metallic powders and the like enter the fluid passage but also the compact valve remarkably simple in construction can be obtained.

What is claimed is:

1. In a normally closed-type fluid control valve, having a guide extending upward from a counter member on an upper surface of a valve base, the improvement comprising:

a cylindrical member having an engaging portion at its lower end and movable up and down within an inner side of the guide, an actuator mounted within the cylindrical member, a support member fixed in position by means of said counter member and said guide at a position below a lower end portion of the actuator, a lower end of the actuator being engaged with an upper surface of said support member, and a pressing spring being interposed between the support member and said engaging portion of the cylindrical member to constantly press a valve body against a valve seat formed in said valve base, whereby closing said valve so that said pressing spring may be compressed by an output of the actuator during the time when the actuator is acting to separate said valve body from said valve seat, thereby opening the valve.

2. An normally closed-type fluid control valve as set forth in claim 1, wherein the actuator is a piezostack.

3. A valve assembly having an actuator for controlling the operative position of a valve member relative to a valve opening comprising:

a housing for supporting the actuator and valve member, the actuator is a piezostack assembly;

first means for biasing the valve member against the valve opening to normally close the valve opening;

second means for biasing the valve member away from the valve opening to normally open the valve opening when the first means is overcome by the bias force of the second means; and means for positioning the actuator to enable a counterforce to be applied to the first means for biasing whereby activation of the actuator will enable the second means for biasing to open the valve assembly.

4. The valve assembly of claim 3 wherein the first and second means for biasing are spring members.

5. The valve assembly of claim 3 wherein a diaphragm seals the valve opening from the second means for biasing.

6. The valve assembly of claim 3 wherein the valve member includes a flexible portion extending radially outward from a valve head.

7. The valve assembly of claim 3 further including spherical joint assemblies connecting the transmission of forces between the respectively the actuator and the first means and the first means and the second means.

8. The valve assembly of claim 3 further including a guide member mounted on the valve assembly for positioning the actuator, the guide member having an upper opening regulator member for mounting the actuator and permitting electrical connection thereto.

9. The valve assembly of claim 6 wherein the valve member includes a peripheral support section connected to the housing.

10. A valve assembly having an actuator for controlling the operative position of a valve member relative to a valve opening, comprising:

a housing for supporting the actuator and valve member;

a first spring for biasing the valve member against the valve opening to normally close the valve opening;

a second spring for biasing the valve member away from the valve opening to normally open the valve opening when the first spring is overcome by the bias force of the second spring;

a diaphragm member sealing the portion of the housing supporting the actuator from the portion of the housing supporting the valve member;

spherical joint assemblies connecting the transmission of forces between the, respectively, the actuator and the first spring and the first spring and the second spring, and means for positioning the actuator to enable a counterforce to be applied to the first spring for biasing, whereby activation of the actuator will enable the second spring for biasing to open the valve assembly.

11. The valve assembly of claim 10 wherein the actuator is a piezostack assembly.

12. A valve assembly having an actuator for controlling the operative position of a valve member relative to a valve opening, comprising:

a housing for supporting the actuator and valve member, the actuator is a piezostack assembly;

a first spring for biasing the valve member against the valve opening to normally close the valve opening;

a second spring for biasing the valve member away from the valve opening to normally open the valve opening when the first spring is overcome by the bias force of the second spring;

a diaphragm member sealing the portion of the housing supporting the actuator from the portion of the housing supporting the valve member, and means for positioning the actuator to enable a counterforce to be applied to the first spring for biasing, whereby activation of the actuator will enable the second spring for biasing to open the valve assembly.

13. The valve assembly of claim 12 wherein the valve member includes a flexible portion extending radially outward from a valve head.

14. The valve assembly of claim 12 further including spherical joint assemblies connecting the transmission of forces between the respectively the actuator and the first spring and the first spring and the second spring.

15. The valve assembly of claim 13 wherein the valve member includes a peripheral support section connected to the housing.

16. The valve assembly of claim 14 further including a guide member mounted on the valve assembly for positioning the actuator, the guide member having an upper opening regulator member for mounting the actuator and permitting electrical connection thereto.

17. A valve assembly having an actuator for controlling the operative position of a valve member relative to a valve opening comprising:

a housing for supporting the actuator and valve member;

first means for biasing the valve member against the valve opening to normally close the valve opening;

second means for biasing the valve member away from the valve opening to normally open the valve opening when the first means is overcome by the bias force of the second means;

a diaphragm for sealing the valve opening from the second means for biasing, and means for positioning the actuator to enable a counterforce to be applied to the first means for biasing whereby activation of the actuator will enable the second means for biasing to open the valve assembly.

18. The valve assembly of claim 17 wherein the actuator is a piezostack assembly.

19. A valve assembly having an actuator for controlling the operative position of a valve member relative to a valve opening comprising:

a housing for supporting the actuator and valve member;

first means for biasing the valve member against the valve opening to normally close the valve opening;

second means for biasing the valve member away from the valve opening to normally open the valve opening when the first means is overcome by the bias force of the second means;

spherical joint assemblies connecting the transmission of forces between the, respectively, actuator and the first means and the first means and the second means, and means for positioning the actuator to enable a counterforce to be applied to the first means for biasing whereby activation of the actuator will enable the second means for biasing to open the valve assembly.

20. The valve assembly of claim 19 wherein the actuator is a piezostack assembly.

* * * * *